Feb. 16, 1965 L. A. MUGGLI ET AL 3,169,496
SEPARABLE TIERED CAKE STAND
Filed Aug. 29, 1963

INVENTORS
LAWRENCE A. MUGGLI,
BY KARL ERICH BERG
David K. Kilgore
ATTORNEY

United States Patent Office 3,169,496
Patented Feb. 16, 1965

3,169,496
SEPARABLE TIERED CAKE STAND
Lawrence A. Muggli, 5948 University Ave. SE., and Karl Erich Berg, 4124 10th Ave. S., both of Minneapolis, Minn.
Filed Aug. 29, 1963, Ser. No. 305,478
3 Claims. (Cl. 108—94)

This invention relates broadly to cake stands; more particularly to a cake stand having a plurality of detachably connected platforms, and specifically to a cake stand having a plurality of platforms to be assembled in upwardly stacked spaced relation to thus provide a tierd cake when the respective platforms are in assembled relation.

The principal object of this invention is to provide a tiered cake stand having a plurality of independent spaced cake platforms assembled in upwardly stacked relation, said platforms being supported by a central supporting post having endwise telescopic engagement the one with the other.

A further object of this invention is to provide a tierd cake stand comprising a plurality of upwardly spaced platforms mounted on independent central mounting posts having interlocking engagement, the one with the other.

A further object of this invention is to provide a cake stand comprised of a plurality of upwardly spaced platforms in stacked relation mounted on independent interlocking central mounting posts and means to overcome the interlocking engagement of said mounting posts to thus afford a Lazy Susan relationship between the respective platforms to permit full rotation of each thereof.

A still further object of this invention is to provide a cake stand comprising a plurality of upwardly spaced cake platforms in stacked relation mounted on independent central mounting posts having endwise telescopic engagement the one with the other, said platforms with a cake thereon being capable of removal from its underlying platform.

These and other objects of this invention will become apparent from the following specification and claims when taken in conjunction with the accompanying drawing which forms a part of this application, and in which drawing, like characters indicate like parts, throughout the several views.

To the above end, generally stated, the invention consists of the following devices and combination of devices hereinafter described and defined in the claims.

Referring to the drawing.

Figure 1:
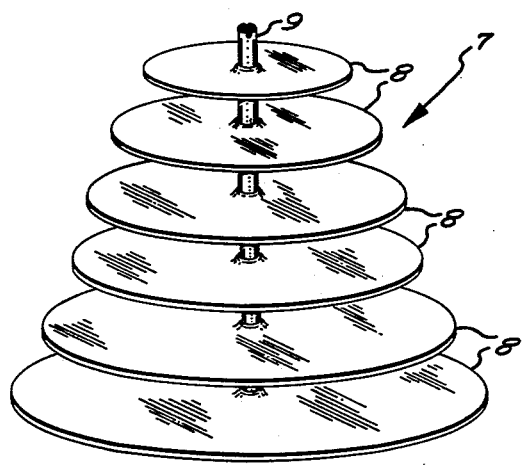
FIG. 1 is a perspective view of the invention in assembled relation.
Figure 2:
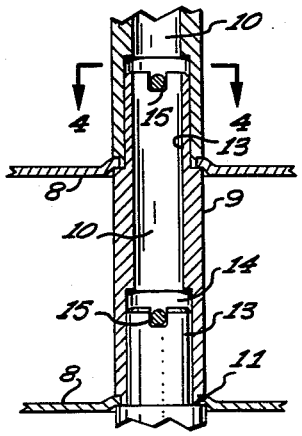
FIG. 2 is a fragmentary view in section on an enlarged scale showing two cake platforms mounted on independent sections of the central mounting posts said section being in interlocking engagement.
Figure 4:
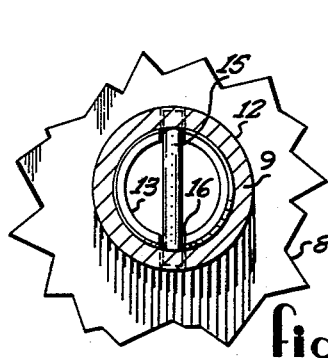
FIG. 4 is a fragmentary view of one of the cake platforms showing the interlocking means of the central mounting posts taken on the line 4—4 of FIG. 2.
Figure 5:
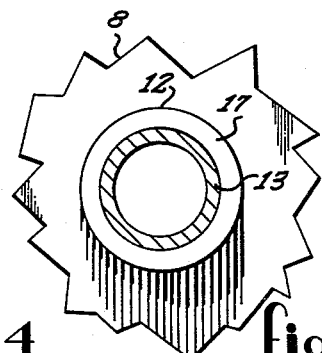
FIG. 5 is a view similar to FIG. 4 with the exception that the means for overcoming the interlocking means of the respective mounting posts is shown, taken on the line 5—5 of FIG. 3, and, FIG. 6 is a fragmentary side elevational view partly in section of one central mounting post also showing the means for overcoming interlocking engagement of the mounting post in exploded relation thereto.
Figure 3:
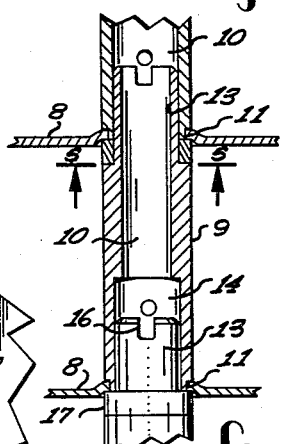
FIG. 3 is a view similar to FIG. 2 without the said section in interlocking engagement.

The number 7 will hereinafter be directed to the subject cake stand as an entirety and the respective cake platform units will be identified generally by the numeral 8 and while the same are illustrated on the drawing as being round, it will be understood that a square or rectangular shape may be adapted for these platforms as may be desired.

Each of the platform units 8 is rigidly secured, one to the lower end portion of each central mounting post 9, and as will presently appear the respective mounting posts are constructed and arranged to engage one another with endwise telescopic movements to thus provide a rigid central mounting post 9 supporting a plurality of cake platforms 8 in upwardly stacked relation in any combination of said platforms that may be desired.

It will be understood that in actual use, the lowermost platform unit 8 will rest flush upon a supporting surface such as a table, not shown, and that the succeeding platform units 8 will be assembled thereon in upwardly stacked progressing relation by means of the engagement of the respective central mounting posts 9.

Figure 6:
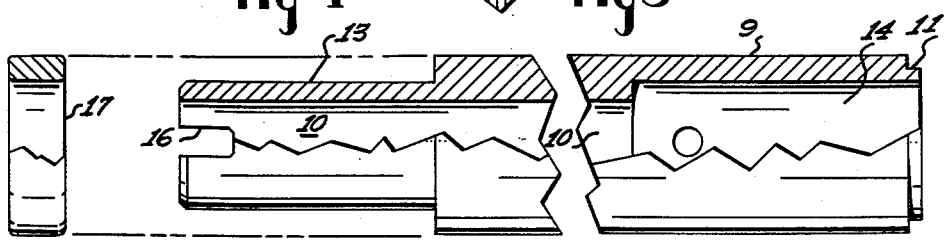

Each of said mounting post sections 9 is formed of a single piece of tubing, having a central bore 10, see FIG. 6, said tubing having sufficient wall thickness to permit the turning of a slightly reduced diameter to form a stop shoulder 11 in the extreme lower end portion of the respective mounting post sections 9. A centrally disposed bore 12, of substantially the same diameter as the said reduced section 11 of the mounting posts 9, is stamped in each of said cake platforms 8 and with the said bore 12 seated on the reduced section of the mounting post 9 to the depth of the stop shoulder 12 a swaging operation is employed to rigidly secure the said cake platforms 8 to the mounting post 9.

A substantial length of the upper end portion of the respective mounting post sections 9 is also turned to a reduced diameter, see numeral 13, said reduced section being dimensioned to engage a counter bore 14 formed in the lower end portion of each mounting post section 9 with a close working fit. This construction actually affords ferruled engagement of the respective sections of the mounting posts 9 and their mounted cake platforms 8, wherein the reduced upper end portion 13 of one of said sections becomes the male portion of the ferrule and the lower end portion of a mating section becomes the female portion of the ferrule.

Generally it is desirable for the respective assembled sections to be held against rotation about the axis of the said mounting post sections and to accomplish this, a transversely disposed pin 15 which extends through the counter-bore 14 near the upper end portion of said counter-bore and is rigidly secured in the wall portions thereof. This pin 15 is constructed and arranged to co-operate with, and engage a pair of circumferentially opposed relatively deep notches 16 formed in the upper end portion of the mounting posts 9 with a close working fit.

Thus when the respective mounting post sections 9 and their mounted platforms 8 are assembled in stacked relation, the male sections thereof will be moved endwise into the next succeeding female section with the notches 16 in the said male section, engaging the pins 15 in the said female section thereby preventing axial rotation of the respective platforms 8.

Under certain conditions and for certain uses, such axial rotation of the platforms 8 relative to one another to afford a Lazy Susan may be desirable and for such purpose there is provided a separate spacer ring 17 that is applicable to each male section of each mounting post and platform assembly. This spacer ring 17 engages the said male section of the mounting post with a relatively close working fit and is of sufficient depth to prevent the engagement of the transverse pin 15 with the circumferentially opposed notches 16. Obviously by the addition of the spacer ring 17 the respective mounting post and platform assemblies are free to rotate about the axis of said mounting posts.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What we claim is:

1. A cake stand of the class described, comprising in combination a plurality of independent mounting post sections having a central bore, a counter-bore in the lower end portion of each thereof, and a reduced diameter in the upper end portion of each thereof, said counter-bore and said reduced diameter being substantially of the same depth and substantially of the same diameter, whereby independent sections of said mounting posts have endwise sliding telescopic movements the one with the other in stacked arrangement, a transversely disposed pin extending through the counter-bore in the lower end portion of each mounting post section and rigidly secured therein and a pair of circumferentially opposed notches formed in the peripheral upper edge portion of each of said mounting post sections, said notches in one mounting post section having engagement with the pin in the next upwardly succeeding mounting post section to thereby hold the assembled sections against axial rotation and a cake supporting platform rigidly secured against axial and endwise movement mounted on the lower end portion of each mounting post section whereby when said mounting post sections and the said cake supporting platform on each thereof, are assembled in interlocking engagement, the said platforms will be held positioned in upwardly spaced tiered relation.

2. The structure of claim 1 further including a spacer ring applicable to the reduced upper end portion of the respective mounting post sections whereby the transverse pins in the lower end portion of the mounting post sections are held out of engagement with the opposed peripheral notches in the upper end portion of the next upwardly succeeding assembled section to thus permit rotation of the said cake supporting platforms.

3. The structure of claim 1 wherein each of said mounting post section and its mounted cake platform is independently removable from its preceding and/or its succeeding assembled mounting post section and cake supporting platform.

References Cited in the file of this patent
UNITED STATES PATENTS

| | | |
|---|---|---|
| 1,056,062 | Saenger | Mar. 18, 1913 |
| 1,401,057 | Elliott | Dec. 20, 1921 |
| 1,570,651 | Topping et al. | Jan. 26, 1926 |
| 1,890,420 | Smith | Dec. 6, 1932 |
| 1,894,146 | Baker | Jan. 10, 1933 |
| 2,443,684 | Lazarus | June 22, 1948 |
| 2,902,174 | Audsley | Sept. 1, 1959 |
| 3,008,586 | Saul | Nov. 14, 1961 |